United States Patent
Hild et al.

(10) Patent No.: US 9,630,367 B2
(45) Date of Patent: Apr. 25, 2017

(54) FIBER-REINFORCED FILM PROCESSES AND FILMS

(71) Applicant: Reynolds Consumer Products Inc., Lake Forest, IL (US)

(72) Inventors: Brent L. Hild, Belmont, MA (US); William P. Belias, Pittsford, NY (US); Steven F. Nielsen, Charlotte, NC (US)

(73) Assignee: REYNOLDS CONSUMER PRODUCTS LLC, Lake Forest, IL (US)

( * ) Notice: Subject to any disclaimer, the term of this patent is extended or adjusted under 35 U.S.C. 154(b) by 744 days.

(21) Appl. No.: 14/097,849

(22) Filed: Dec. 5, 2013

(65) Prior Publication Data

US 2014/0090776 A1  Apr. 3, 2014

Related U.S. Application Data

(62) Division of application No. 13/296,621, filed on Nov. 15, 2011, now Pat. No. 9,233,509, which is a division
(Continued)

(51) Int. Cl.
*B29C 39/18* (2006.01)
*B29C 43/28* (2006.01)
(Continued)

(52) U.S. Cl.
CPC ............... *B29D 7/01* (2013.01); *B29C 39/18* (2013.01); *B29C 39/203* (2013.01); *B29C 43/28* (2013.01);
(Continued)

(58) Field of Classification Search
CPC ....... B29C 39/18; B29C 39/203; B29C 43/24; B29C 43/28; B29C 43/30; B29C 43/305;
(Continued)

(56) References Cited

U.S. PATENT DOCUMENTS

| 2,641,022 A | 6/1953 | Kress |
| 3,068,516 A | 12/1962 | Hofer |

(Continued)

FOREIGN PATENT DOCUMENTS

WO    WO 00/71326    11/2000

OTHER PUBLICATIONS

U.S. Appl. No. 10/775,601, filed Feb. 10, 2004.
(Continued)

*Primary Examiner* — Michael Tolin
(74) *Attorney, Agent, or Firm* — Baker Botts, L.L.P.

(57) ABSTRACT

Cast-film process for making a fiber-reinforced film is disclosed. The process includes providing at least a first thermoplastic resin, melting the at least first thermoplastic resin, extruding the at least first thermoplastic resin through a first extension die to form a first thermoplastic film, providing at least a second thermoplastic resin, melting the at least second thermoplastic resin, extruding the at least second thermoplastic resin through a second extension die to form a second thermoplastic film, transporting the first and second thermoplastic films along respective casting rollers, and introducing a plurality of fibers between the first and second thermoplastic films so as to form a fiber-reinforced film having a thickness between about 0.2 mil to about 2.0 mils and having a first thermoplastic layer, a second thermoplastic layer, and a plurality of fibers dispersed therebetween. Cast-film process for making a fiber-reinforced bag is also disclosed.

10 Claims, 6 Drawing Sheets

Related U.S. Application Data of application No. 10/775,601, filed on Feb. 10, 2004, now Pat. No. 8,079,945.

(51) Int. Cl.

| | | |
|---|---|---|
| *B29C 47/02* | (2006.01) | |
| *B29C 70/50* | (2006.01) | |
| *B65F 1/00* | (2006.01) | |
| *B32B 27/12* | (2006.01) | |
| *B32B 37/15* | (2006.01) | |
| *B29D 7/01* | (2006.01) | |
| *B29C 39/20* | (2006.01) | |
| *B29C 43/30* | (2006.01) | |
| *B29C 70/08* | (2006.01) | |
| *B32B 37/28* | (2006.01) | |
| *B29C 47/00* | (2006.01) | |
| *B29L 31/00* | (2006.01) | |
| *B29C 47/06* | (2006.01) | |

(52) U.S. Cl.
CPC .......... *B29C 43/305* (2013.01); *B29C 70/086* (2013.01); *B29C 70/50* (2013.01); *B32B 27/12* (2013.01); *B32B 37/153* (2013.01); *B32B 37/28* (2013.01); *B65F 1/0006* (2013.01); *B29C 47/0026* (2013.01); *B29C 47/0057* (2013.01); *B29C 47/0059* (2013.01); *B29C 47/02* (2013.01); *B29C 47/065* (2013.01); *B29L 2031/7128* (2013.01); *B32B 2305/22* (2013.01); *B32B 2439/06* (2013.01); *B32B 2553/00* (2013.01); *Y10T 428/1352* (2015.01); *Y10T 428/1362* (2015.01); *Y10T 428/24975* (2015.01); *Y10T 428/26* (2015.01); *Y10T 428/27* (2015.01)

(58) Field of Classification Search
CPC .............. B29C 47/0021; B29C 47/004; B29C 47/0064; B29C 47/02; B29C 47/065; B29C 70/06; B29C 70/08; B29C 70/086; B29C 70/50; B29C 70/504; B29D 7/01; B29L 2031/7128; B29L 2031/7129; B65D 33/02; B65F 1/0006; B32B 5/022; B32B 27/12; B32B 27/302; B32B 27/304; B32B 27/32; B32B 27/34; B32B 27/36; B32B 37/15; B32B 37/153; B32B 2439/06

See application file for complete search history.

(56) References Cited

U.S. PATENT DOCUMENTS

| | | | |
|---|---|---|---|
| 3,157,560 A | 11/1964 | Livingston et al. | |
| 3,589,958 A | 6/1971 | Schrenk | |
| 3,709,642 A | 1/1973 | Stannard | |
| 3,765,922 A | 10/1973 | Chisholm | |
| 4,087,577 A * | 5/1978 | Hendrickson ........... | B29C 70/22 156/244.12 |
| 4,108,714 A | 8/1978 | Keller et al. | |
| 4,302,269 A * | 11/1981 | Steinberg ............ | B29C 47/0004 156/243 |
| 4,304,622 A * | 12/1981 | Krumm ............... | B29C 47/0047 156/243 |
| 4,397,703 A | 8/1983 | Osborn | |
| 4,592,941 A | 6/1986 | Emmons | |
| 4,834,832 A | 5/1989 | Stock et al. | |
| 5,328,743 A | 7/1994 | Wynne et al. | |
| 5,359,001 A | 10/1994 | Epple et al. | |
| 5,380,388 A | 1/1995 | Montagne et al. | |
| 5,773,373 A | 6/1998 | Wynne et al. | |
| 5,985,071 A | 11/1999 | Wynne et al. | |
| 6,054,178 A * | 4/2000 | Howells ................. | B29C 43/28 427/209 |
| 6,821,373 B1 * | 11/2004 | Berlin .................... | B32B 27/10 156/244.11 |
| 7,153,465 B1 | 12/2006 | Schwab et al. | |
| 8,079,945 B2 | 12/2011 | Hild et al. | |
| 2012/0064270 A1 | 3/2012 | Hild et al. | |

OTHER PUBLICATIONS

U.S. Appl. No. 13/296,621, filed Nov. 15, 2011.
U.S. Appl. No. 10/775,601, filed Nov. 15, 2011, Issue Fee payment.
U.S. Appl. No. 10/775,601, filed Sep. 22, 2011, Notice of Allowance.
U.S. Appl. No. 10/775,601, filed Sep. 12, 2011, Patent Board Decision—Examiner Reversed.
U.S. Appl. No. 10/775,601, filed Sep. 23, 2009, Reply Brief Filed.
U.S. Appl. No. 10/775,601, filed Jul. 23, 2009, Examiner's Answer to Appeal Brief.
U.S. Appl. No. 10/775,601, filed May 19, 2009, Supplemental Appeal Brief.
U.S. Appl. No. 10/775,601, filed Mar. 5, 2009, Appeal Brief Filed.
U.S. Appl. No. 10/775,601, filed Jan. 23, 2009, Appeal Brief Filed.
U.S. Appl. No. 10/775,601, filed Nov. 25, 2009, Notice of Appeal.
U.S. Appl. No. 10/775,601, filed Aug. 25, 2008, Final Office Action.
U.S. Appl. No. 10/775,601, filed Jul. 11, 2008, Response to Non-Final Office Action.
U.S. Appl. No. 10/775,601, filed Apr. 14, 2008, Non-Final Office Action.
U.S. Appl. No. 10/775,601, filed Jan. 31, 2008, Amendment and Request for Continued Examination (RCE).
U.S. Appl. No. 10/775,601, filed Jan. 24, 2008, Advisory Action.
U.S. Appl. No. 10/775,601, filed Dec. 28, 2007, Response to Final Office Action.
U.S. Appl. No. 10/775,601, filed Oct. 31, 2007, Final Office Action.
U.S. Appl. No. 10/775,601, filed Sep. 17, 2007, Response to Non-Final Office Action.
U.S. Appl. No. 10/775,601, filed Mar. 13, 2007, Non-Final Office Action.
U.S. Appl. No. 10/775,601, filed Jan. 29, 2007, Response to Restriction Requirement.
U.S. Appl. No. 10/775,601, filed Dec. 26, 2006, Restriction Requirement.
U.S. Appl. No. 13/296,621, filed Jul. 17, 2014, Response to Non-Final Office Action.
U.S. Appl. No. 13/296,621, filed Apr. 17, 2014, Non-Final Office Action.
U.S. Appl. No. 13/296,621, filed Oct. 17, 2013, Response to Restriction Requirement.
U.S. Appl. No. 13/296,621, filed Sep. 17, 2013, Restriction Requirement.

* cited by examiner

US 9,630,367 B2

FIBER-REINFORCED FILM PROCESSES AND FILMS

CROSS REFERENCE TO RELATED APPLICATION

The present application is a divisional application of U.S. application Ser. No. 13/296,621 filed Nov. 15, 2011, now U.S. Pat. No. 9,233,509, issued Jan. 12, 2016, which is a divisional application of U.S. application Ser. No. 10/775,601, filed Feb. 10, 2004, now U.S. Pat. No. 8,079,945, issued Dec. 20, 2011, both of which are hereby incorporated by reference in their entireties.

FIELD OF THE INVENTION

The present invention relates generally to thermoplastic film processes and films. More specifically, the present invention relates to fiber-reinforced thermoplastic film processes and films.

BACKGROUND OF THE INVENTION

Polymeric films have been used over the years in a variety of applications. One such application of these films is in forming the common household item of trash bags. There are several methods for forming trash bags, but typical methods include blown film processes and cast processes.

There are several properties that are desirable in films that are used in trash bags. For example, it is desirable to have a high tear strength and high tensile strength. This enables the trash bag to be filled with more material while at the same time it is more resistant to tears or breaks. Having such properties reduces the likelihood of the consumer having the filled trash bag tear or break. Similarly, it is also desirable to have a high puncture resistance that prevents or inhibits punctures from occurring in the trash bag. To save costs associated with polymeric resins, it would also be desirable to have a combination of properties such a high tear strength, high tear strength, and high puncture resistance using a smaller percentage of polymeric resin.

Therefore, there is a need for an improved thermoplastic film process and a film to overcome the above-described problems.

SUMMARY OF THE INVENTION

According to one process, a blown-film process for making a fiber-reinforced film comprises providing and melting at least one thermoplastic resin. The at least one thermoplastic resin is extruded through an extension die to form a film bubble. A plurality of fibers is introduced inside of the film bubble. The fibers are distributed inside of the film bubble. The film bubble is collapsed after introducing the plurality of fibers so as to form a fiber-reinforced film. The fiber-reinforced film has a first thermoplastic layer, a second thermoplastic layer, and a plurality of fibers dispersed therebetween.

According to another process, a blown-film process for making a fiber-reinforced bag comprises providing and melting at least one thermoplastic resin. The at least one thermoplastic resin is extruded through an extension die to form a film bubble. A plurality of fibers is introduced inside of the film bubble. The fibers are distributed inside of the film bubble. The film bubble is collapsed after introducing the plurality of fibers so as to form a fiber-reinforced film. The fiber-reinforced film has a first thermoplastic layer, a second thermoplastic layer, and a plurality of fibers dispersed therebetween. A first and a second body panel are formed from the fiber-reinforced film. The first and second body panels are closed along two opposing sides and a bottom to form the fiber-reinforced bag.

According to yet another process, a blown-film process for making a fiber-reinforced bag comprises providing at least one thermoplastic resin being selected from the group consisting of polyolefins, polyesters, nylons, alkenyl aromatic polymers, polyvinyl chlorides, and combinations thereof. The at least one thermoplastic resin is melted. The at least one thermoplastic resin is extruded through an extension die to form a film bubble. A plurality of fibers is introduced inside of the film bubble. The plurality of fibers is electrically charged to assist in improving the affinity of the plurality of fibers to the film bubble. The fibers are distributed inside of the film bubble such that the plurality of fibers contacts an inner surface of the film bubble. The film bubble is collapsed after introducing the plurality of fibers so as to form a fiber-reinforced film. The fiber-reinforced film has a first thermoplastic layer, a second thermoplastic layer, and a plurality of fibers dispersed therebetween. The total thickness of the first and second thermoplastic layers is from about 0.4 mil to about 1.0 mil. A first and a second body panel are formed from the fiber-reinforced film. The first and second body panels are closed along two opposing sides and a bottom to form the bag.

According to a further process, a cast-film process for making a fiber-reinforced film comprises providing and melting at least a first thermoplastic resin. The at least first thermoplastic resin is extruded through a first extension die to form a first thermoplastic film. At least a second thermoplastic resin is provided and melted. The at least second thermoplastic resin is extruded through a second extension die to form a second thermoplastic film. The first and second thermoplastic films are transported along respective casting rollers. A plurality of fibers is introduced between the first and second thermoplastic films so as to form a fiber-reinforced film. The fiber-reinforced film has a first thermoplastic layer, a second thermoplastic layer, and a plurality of fibers dispersed therebetween.

According to yet a further process, a cast-film process for making a fiber-reinforced film comprises providing and melting at least a first thermoplastic resin. The at least first thermoplastic resin is extruded through a first extension die to form a first thermoplastic film. At least a second thermoplastic resin is provided and melted. The at least second thermoplastic resin is extruded through a second extension die to form a second thermoplastic film. The first and second thermoplastic films are transported along respective casting rollers. A plurality of fibers is introduced between the first and second thermoplastic films so as to form a fiber-reinforced film. The fiber-reinforced film has a first thermoplastic layer, a second thermoplastic layer, and a plurality of fibers dispersed therebetween. A first and a second body panel are formed from the fiber-reinforced film. The first and second body panels are closed along two opposing sides and a bottom to form the bag.

According to one embodiment, a fiber-reinforced film comprises at least two layers and a plurality of fibers therebetween. The first layer is made of at least a first thermoplastic resin and the second layer being made of at least a second thermoplastic resin. The film has a MD tear of greater than 250 g as measured in accordance with ASTM D 1922, a MD tensile strength of greater than about 800 as measured in accordance with ASTM D 882, and a puncture resistance of greater than 120 g as measured in accordance with ASTM D 1709 and the basis weight of the plurality of fibers is less than about 10 g/m²

According to another embodiment, a fiber-reinforced bag comprises first and second opposing body panels that are closed along two opposing sides and a bottom. Each of the first and second opposing body panels comprises a fiber-reinforced film. The fiber-reinforced film comprises at least two layers and a plurality of fibers therebetween. The first layer is made of at least a first thermoplastic resin and the second layer is made of at least a second thermoplastic resin. The film has a MD tear of greater than 250 g as measured in accordance with ASTM D 1922, a MD tensile strength of greater than about 800 as measured in accordance with ASTM D 882, and a puncture resistance of greater than 120 g as measured in accordance with ASTM D 1709 and the basis weight of the plurality of fibers is less than about 10 g/m².

BRIEF DESCRIPTION OF THE DRAWINGS

The foregoing and other advantages of the invention will become apparent upon reading the following detailed description and upon reference to the drawings.

FIG. 2b is a cross-sectional view taken generally across line 2b-2b of FIG. 2a;

FIG. 3b is a cross-sectional view taken generally across line 3b-3b of FIG. 3a;

Figure 1:
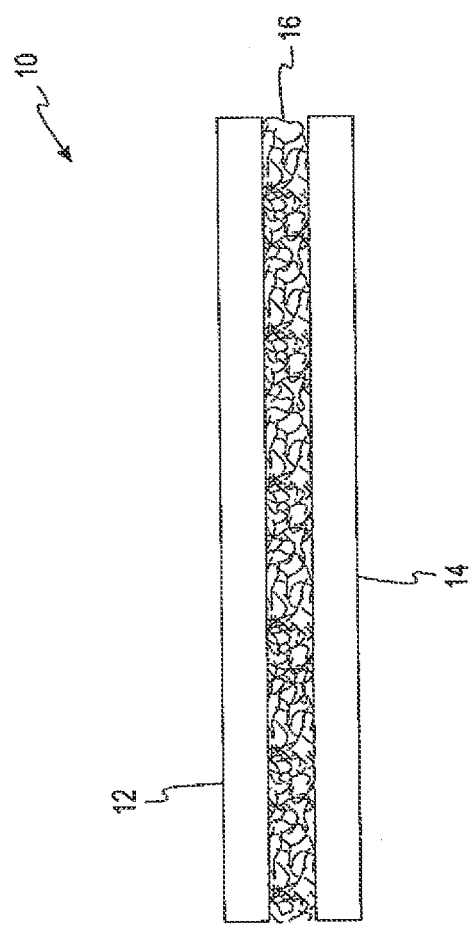
FIG. 1 is an end view of a fiber-reinforced film according to one embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to fiber-reinforced film processes and films. More specifically, the fiber-reinforced films of the present invention comprise a first thermoplastic layer, a second thermoplastic layer, and a plurality of fibers dispersed between the first and second thermoplastic layers. The fiber-reinforced films of the present invention have desirable tear strength, desirable tensile strength, and puncture-resistant properties. The fiber-reinforced films may be used in applications such as trash bags, food bags, and storage bags, including heavy-duty bags (e.g., bags containing sand). It is contemplated that the fiber-reinforced films may be used in a variety of other applications such as thermal insulation (housewrap) and wrap for protecting shipped goods that are commonly used with pallets.

First and Second Thermoplastic Layers

According to one embodiment, a fiber-reinforced film 10 is shown in FIG. 1. The fiber-reinforced film 10 comprises a first thermoplastic layer 12, a second thermoplastic layer 14, and a plurality of fibers 16 dispersed between the first and second thermoplastic layers 12, 14.

The first thermoplastic layer 12 and second thermoplastic layer 14 may be formed from suitable thermoplastic materials. Some thermoplastic materials that may be used in forming the first thermoplastic layer 12 and the second thermoplastic layer 14 include, but are not limited to, polyolefins, polyesters (e.g., polyethylene terephthalate), nylons, alkenyl aromatic polymers (e.g., polystyrenes), polyvinyl chlorides, or combinations thereof. Thus, the thermoplastic layers 12, 14 may be formed from blends.

Some contemplated polyolefins include polyethylenes, polypropylenes, cyclic olefin copolymers (COCs), or combinations thereof. Some contemplated polyethylenes include linear low density polyetheylenes (LLDPEs), metallocene-catalyzed LLDPEs, low density polyethylenes (LDPEs), high density polyethylenes (HDPEs), or combinations thereof. It is contemplated that the first and second thermoplastic layers 12, 14 may be formed from independently selected resins.

Useful cyclic olefin copolymers are available from several companies. For example, Ticona, a business of Celanese AG, in Summit, N.J. has cyclic olefin copolymers available. Other companies that have cyclic olefin copolymers available include Nippon Zeon Co., Ltd. (Japan) and Mitsui Chemical (Japan). Nippon Zeon Co., Ltd. has commercially available cyclic olefin copolymers (COCs) under the designation ZEONEX®. Ticona, a business of Celanese AG, has commercially available cyclic olefin copolymers (COCs) under the designation TOPAS®. The cyclic olefin copolymers which are commercially available under the designation TOPAS® are believed to be prepared with feedstocks of norbornene and ethylene and the use of a metallocene catalyst.

The term "alkenyl aromatic polymer" as used herein includes polymers of aromatic hydrocarbon molecules that contain an aryl group joined to an olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, and vinyl toluene. Alkenyl aromatic polymers also include homopolymers of styrene (commonly referred to as polystyrene), copolymers of styrene and butadiene, and rubber-toughened polystyrene (commonly referred to as high impact polystyrene or HIPS). The alkenyl aromatic polymer may be an oriented polystyrene (OPS)

The film generally has a MD (machine direction) tensile strength greater than about 1,000 psi as measured in accordance with ASTM D 882. The film typically has a MD tensile strength of greater than about 1,200 or 1,300 psi as measured in accordance with ASTM D 882. The film generally has a TD (transverse direction) tensile strength greater than about 1,300 psi as measured in accordance with ASTM D 882. The film typically has a TD tensile strength of greater than about 1,500 or 1,600 psi as measured in accordance with ASTM D 882.

The film generally has a MD load at yield of greater than about 1.2 lbf as measured in accordance with ASTM D 882. The film typically has a MD load at yield of greater than about 1.3 or 1.4 lbf as measured in accordance with ASTM D 882. The film generally has a TD load at yield of greater than about 1.3 lbf as measured in accordance with ASTM D 882. The film typically has a TD load at yield of greater than about 1.4 or 1.5 lbf as measured in accordance with ASTM D 882.

The film generally has a MD ultimate strength of greater than about 3,000 psi as measured in accordance with ASTM D 882. The film typically has a MD ultimate strength of greater than about 4,000 or 4,500 psi as measured in accordance with ASTM D 882. The film generally has a TD ultimate strength of greater than about 2,000 psi as measured in accordance with ASTM D 882. The film typically has a TD ultimate strength of greater than about 3,000 or 3,500 psi as measured in accordance with ASTM D 882.

The film generally has a MD Elmendorf tear of greater than about 175 g as measured in accordance with ASTM D 1922. The film typically has a MD Elmendorf tear of greater than about 200 or 250 g as measured in accordance with ASTM D 1922. The film generally has a TD Elmendorf tear of greater than about 750 g as measured in accordance with ASTM D 1922. The film typically has a TD Elmendorf tear of greater than about 850 or 950 g as measured in accordance with ASTM D 1922.

The film generally has a puncture resistance of greater than about 120 g as measured in accordance with ASTM D 1709 (F-50 Dart Drop Test). The film typically has a puncture resistance of greater than about 140 g as measured in accordance with ASTM D 1709 (F-50 Dart Drop Test).

The total thickness of the first and second thermoplastic layers 12, 14 is generally from about 0.2 mil to about 2.0 mils and, more typically, from about 0.4 to about 1.0 mil. It is contemplated that the first and second thermoplastic layers may have different thicknesses.

Plurality of Fibers

The fiber-reinforced film 10 includes a plurality of fibers 16 dispersed between the first and second thermoplastic layers 12, 14. The plurality of fibers 16 may be formed from a variety of materials such as thermoplastic materials, fiberglass, metal, natural fibers (e.g., cotton, paper, and cellulose), and combinations thereof.

Some thermoplastic materials that may be used in forming the plurality of fibers 16 include, but are not limited to, polyolefins, polyesters (e.g., polyethylene terephthalate), nylons, alkenyl aromatic polymers (e.g., polystyrenes), polyvinyl chlorides, or combinations thereof. It is contemplated that thermosets may be used in forming the plurality of fibers. Thermosets are defined herein as including crosslinked thermoplastic materials.

Some contemplated polyolefins include polyethylenes, polypropylenes, cyclic olefin copolymers (COCs) such as described above, or combinations thereof. Some contemplated polyethylenes include linear low density polyetheylenes (LLDPEs), metallocene-catalyzed LLDPEs, low density polyethylenes (LDPEs), high density polyethylenes (HDPEs), or combinations thereof. To improve the tensile strength, tear resistance and puncture resistance, the plurality of fibers 16 may include cyclic olefin copolymers or metallocene-catalyzed LLDPEs.

It is contemplated that KEVLAR® polymer may be used in forming the plurality of fibers. A KEVLAR® polymer is a polymer made by DuPont that is formed from monomers that are believed to contain fourteen carbon atoms, two nitrogen atoms, two oxygen atoms, and ten hydrogen atoms. It is also contemplated that NOMEX® fibers may be used in the present invention. NOMEX® is the brand name of a family of fibers produced by DuPont that contains a blend of at least 5% KEVLAR®.

It is also contemplated that rayon fiber may be used in forming the plurality of fibers. Rayon fiber is defined herein as including a manufactured fiber composed of regenerated cellulose, in which substituents have replaced less than 15% of the hydrogens of the hydroxyl groups.

The plurality of fibers 16 may be formed from at least two materials. For example, the plurality of fibers 16 may include a first material that is directed to improving the adhesion to the first and second thermoplastic layers 12, 14 and a second material that is directed to improving one or more of the following properties: tensile strength, tear resistance and puncture resistance. One such example is having the plurality of fibers formed of a blend of a polyolefin such as a LDPE or LLDPE resin in combination with a cyclic olefin copolymer or a metallocene-catalyzed LLDPE. It is contemplated that other blends of the plurality of fibers may be used.

To provide a better distribution of the plurality of fibers between the first and second thermoplastic layers, it may be desirable to have the plurality of fibers to be near or actual contact the thermoplastic layers. It may also be desirable to have the plurality of fibers adhere to the first and second thermoplastic layers. Adhesion of the fibers to the first and second thermoplastic layers may occur after pressure is applied between the film layers and the plurality of fibers.

It is contemplated that horizontal and vertical extrusion processes may be used. These extrusion processes may produce a different distribution of fibers between the first and second thermoplastic layers. For example, in a horizontal process, the distribution of the fibers may be more skewed toward the center of the thermoplastic film. In a vertical extrusion process, the film bubble or tube may extend upwardly or downwardly from the extrusion die. In a vertical extrusion process where the film bubble extends upwardly, the plurality of fibers tends to be more evenly distributed. In a vertical process where the film bubble extends downwardly, the plurality of fibers tends to be more evenly distributed. The plurality of fibers exits an extension die and falls with gravity. It is generally more desirable to have a vertical process where the film bubble is extruded downward from the extension die.

To assist in having the fibers contact the thermoplastic film bubble, the plurality of fibers and the film bubble may have different charges. For example, the plurality of fibers may have a negative charge and the thermoplastic film bubble may have a positive charge. Alternatively, the plurality of fibers may have a positive charge and the thermoplastic film bubble may have a negative charge. The charge induced on the fibers typically occurs as the fibers are being distributed into the film bubble. The charges on the plurality of fibers and the thermoplastic film bubble may be induced by electrostatic charging units.

Each of the plurality of fibers 16 may be formed from a plurality of layers. For example, each of the plurality of fibers may include a first layer that is directed to improving the contact or adhesion to the first and second thermoplastic layers 12, 14 and a second layer that is directed to improving one or more of the following properties: tensile strength, tear resistance, or puncture resistance. One such example is having the plurality of fibers formed of a first layer of a polyethylene (e.g., LDPE or LLDPE resin) and a second layer of a cyclic olefin copolymer or a metallocene-catalyzed LLDPE. Another contemplated example includes having a first layer being made of a polyethylene and a second layer being a polyester. The first and second layers of each of the plurality of fibers may be formed by an extrusion process.

It is contemplated that the plurality of fibers 16 may be present in such an amount between the first and second thermoplastic layers 12, 14 to be considered a layer in the fiber-reinforced film 10. Alternatively, the plurality of fibers 16 may not be present in such an amount to be considered a layer in the fiber-reinforced film 10. Generally, the plurality of fibers 16 will be present in amount that the first and second thermoplastic layers do not touch each other. It is contemplated that smaller areas of the fiber-reinforced film may not have fibers such that the first and second thermoplastic layers touch each other.

The plurality of fibers to be used in forming the fiber-reinforced film may be particles. These particles, when present in a significant amount, act like non-woven fibers. Non-woven fibers are defined herein as including engineered fabric structures made directly from fibers or from the materials from which the fibers themselves are made. The term non-woven-fibers includes fabric that have been produced by a process different from weaving or, more broadly, a fabric that is different from a traditional textile fabric, paper sheet, or plastic film.

The plurality of fibers is generally of a small size and generally has a length of from about 0.25 to about 6 inches. It is contemplated that the plurality of fibers may be longer than 6 inches. More typically, the length of the plurality of fibers is from about 0.5 to about 1.5 inches. The length of the plurality of fibers may vary with respect to each other. If the plurality of fibers is generally circular, the diameter of the plurality of fibers would be generally from about 0.1 mil to 2.0 mils and, typically, from about 0.3 mil to about 1 mil. The plurality of fibers may be of several shapes such as generally circular, oval, trilobal, hollow-shaped, or polygonal shapes. It is desirable for the plurality of fibers to be sized appropriately to keep the fibers fluidized with the air flow. The term "fluidized" used as defined herein is the random movement of the solid fiber particles formed by transporting the solid fiber particles that acts like a fluid.

Generally speaking, the greater the amount of fibers, the greater the tensile strength, tear resistance, and the puncture resistance. Generally speaking, the greater the length of the fibers, the greater the tensile strength, tear resistance, and puncture resistance. The length of the fibers also improves adhesion of the plurality of fibers with the first and second thermoplastic layers because the longer fibers have a greater surface area. Similarly, shorter and thicker fibers also have improved adhesion to the first and second thermoplastic layers because of the increased surface area.

The plurality of fibers desirably has a much higher modulus as compared to the material that forms the first and second thermoplastic layers 12, 14. The higher modulus of the plurality of fibers may occur from physical modifications, chemical modifications, or both. For example, the physical modification may be formed by the process of making the plurality of fibers in which the fibers are oriented in one direction. As discussed above, chemical modification of the plurality of fibers may include adding a blend of components such as polyethylene and a cyclic olefin copolymer.

The plurality of fibers generally has a density of from about 0.90 to about 1.55 $g/cm^3$. An example of material having a density of about 0.90 $g/cm^3$ is polypropylene, and an example of material having a density of about 1.55 $g/cm^3$ is rayon.

The plurality of fibers generally has a basis weight (number of fibers per square meter) of from about 1 to about 10 $g/m^2$. The basis weight is determined by cutting a square meter of material and weighing this material on a scale. The plurality of fibers generally has a basis weight less than 10 $g/m^2$. The plurality of fibers more typically has a basis weight of from about 1 to about 5 $g/m^2$ and generally has a basis weight less than 5 $g/m^2$.

The fiber generally has a denier of from about 1.5 to about 30 g. Denier is defined herein as the weight (in grams) of a 9,000 m length of fiber.

As will be discussed below, the plurality of fibers according to one process may be formed in an extrusion process. It is also contemplated that the plurality of fibers may be purchased commercially from a number of companies. For example, staple fibers may be purchased from Fibers Innovation Technologies, Inc. such as polyester or polyethylene fibers. Staple fibers such as polyester or polyethylene fibers may be purchased from DuPont. The plurality of fibers may be purchased in a form commonly referred to as "staple fiber", such as a "nonwoven staple fiber."

One example of a fiber that may be used is a nonwoven polyethylene fiber. The polyethylene fiber includes about 88 wt % LDPE or LLDPE with the remainder being a cyclic olefin copolymer. The polyethylene fiber has a diameter of about 0.5 mil and a density of about 0.92 $g/cm^3$. This polyethylene fiber has a denier of about 4 g.

Other Ingredients/Layers in the Fiber-Reinforced Film

The fiber-reinforced film may include other layers and/or additional materials. It is contemplated that slip agents or anti-block agents may be added to the thermoplastic films of the fiber-reinforced film. An example of a slip agent is erucamide and examples of anti-block agents include calcium carbonate, talc, or the combination thereof. It is contemplated that other slip or anti-block agents may be used in the thermoplastic films of the fiber-reinforced film. It is contemplated that the anti-block agents, such as calcium carbonate, may be added to the plurality of fibers to assist in providing enhanced properties such as improving tensile yield and tensile modulus. It is also contemplated that endothermic or exothermic blowing agents may be added to the fiber-reinforced film.

It is contemplated that the thermoplastic film layers, the plurality of fibers or both may include a low-melt adhesive to assist in maintaining the contact of the thermoplastic film layers and plurality of fibers. An example of a low-melt adhesive is ethylene vinyl acetate (EVA). If the low-melt adhesive is used in the thermoplastic film layers, it should be located on the surfaces that are closest to the plurality of fibers. Similarly, the low-melt adhesive, if used, should be located on outer surfaces of the plurality of fibers. If a low-melt adhesive is used, the low-melt adhesive may be coextruded with the thermoplastic film layers, the plurality of fibers, or both.

Other additives such as pigments, anti-oxidants, fragrances, odor-masking and/or neutralizing agents, anti-microbials, animal or animal repellants, or combinations thereof may be added to the fiber-reinforced films. Anti-oxidants assist in preventing or slowing the breakdown of another material by oxygen. The use of anti-oxidants preferably prevents or inhibits undesirable aromas from items such as food. Some contemplated anti-oxidants include iron and vitamin E.

Some scented aromas or fragrances include citronella, pine, flowery, citrus, limonene and substituted esters such as METAZENE®. A scented-enhancing layer may be added to enhance delivery of a scent with increasing humidity. One example of a scent-enhancing layer is polyvinyl alcohol (PVOH). It is also contemplated that odor-masking and/or neutralizing structures may be added.

It is also contemplated that a variety of active ingredients such as anti-microbials, or animal or insect repellants may be added. Some contemplated anti-microbials include chlorine dioxide, triclosan, and allyl isothiocyanate. Other anti-microbials include natural oils such as cinnamon, peppermint, or spearmint. Examples of animal or insect repellants include natural oils such as cinnamon, peppermint, or spearmint.

Properties of the Fiber-Reinforced Films

The thickness of the fiber-reinforced film is generally from about 0.8 mil to about 2.0 mils and, more specifically, from about 1.0 mil to about 1.6 mils.

The fiber-reinforced film generally has a MD (machine direction) tensile strength of greater than about 1,000 psi as measured in accordance with ASTM D 882. The fiber-reinforced film typically has a MD tensile strength of greater than about 1,100 psi as measured in accordance with ASTM D 882. The fiber-reinforced film generally has a TD (transverse direction) tensile strength of greater than about 800 psi as measured in accordance with ASTM D 882. The fiber-reinforced film typically has a TD tensile strength of greater than about 900 psi as measured in accordance with ASTM D 882. Generally speaking, the tensile strength of the fiber-reinforced film increases as the amount of fiber increases within the thermoplastic film layers.

The fiber-reinforced film generally has a MD load at yield of greater than about 1.6 lbf as measured in accordance with ASTM D 882. The fiber-reinforced film typically has a MD load at yield of greater than about 1.75 lbf as measured in accordance with ASTM D 882. The fiber-reinforced film generally has a TD load at yield of greater than about 1.4 lbf as measured in accordance with ASTM D 882. The fiber-reinforced film typically has a TD load at yield of greater than about 1.5 lbf as measured in accordance with ASTM D 882.

The fiber-reinforced film generally has a MD ultimate strength of greater than about 3,000 psi as measured in accordance with ASTM D 882. The fiber-reinforced film typically has a MD ultimate strength of greater than about 3,500 or 4,000 psi as measured in accordance with ASTM D 882. The fiber-reinforced film generally has a TD ultimate strength of greater than about 1,500 psi as measured in accordance with ASTM D 882. The fiber-reinforced film typically has a TD ultimate strength of greater than about 1,750 or 2,000 psi as measured in accordance with ASTM D 882.

The fiber-reinforced film generally has a MD Elmendorf tear of greater than about 250 g as measured in accordance with ASTM D 1922. The fiber-reinforced film typically has a MD Elmendorf tear greater than about 300 or 350 g as measured in accordance with ASTM D 1922. The fiber-reinforced film generally has a desirable TD Elmendorf tear that does not tear as measured in accordance with ASTM D 1922. The fiber-reinforced film generally has a puncture resistance greater than about 120 g as measured in accordance with ASTM D 1709 (F-50 Dart Drop Test). The fiber-reinforced film typically has a puncture resistance greater than about 130 g as measured in accordance with ASTM D 1709 (F-50 Dart Drop Test).

Figure 2A:
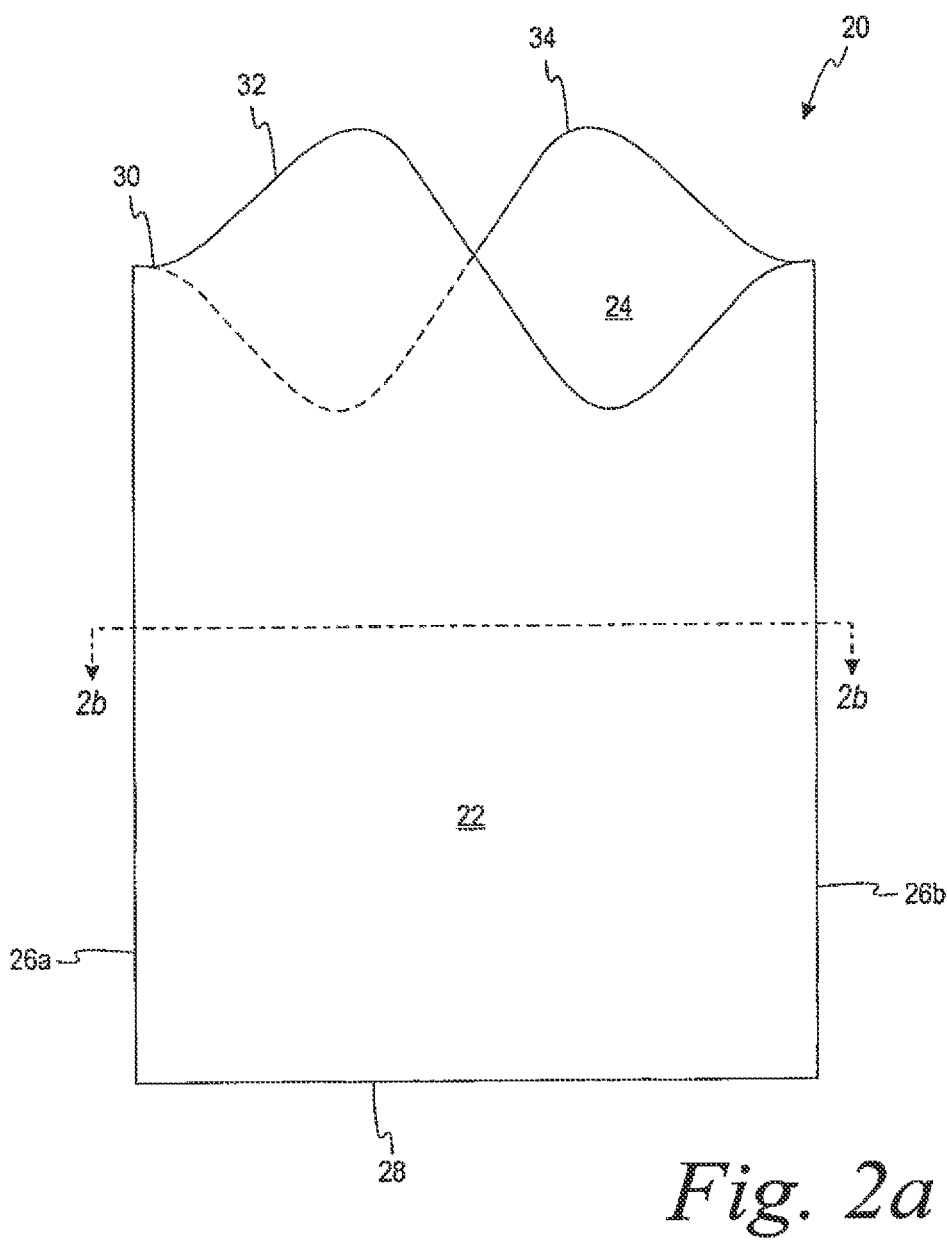
FIG. 2a is a polymeric bag according to one embodiment.
Figure 2B:
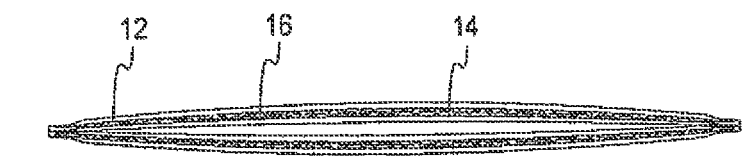

The fiber-reinforced film may be used to form a polymeric bag. According to one embodiment, the fiber-reinforced film 10 is used to form a polymeric bag. As shown in FIG. 2a, a polymeric bag 20 is illustrated according to one embodiment of the present invention. The polymeric bag 20 comprises a first panel 22 and a second panel 24 that are formed from the fiber-reinforced film 10. A cross-sectional view of the panels generally taken along line 2b-2b in FIG. 2a is depicted in FIG. 2b. FIG. 2b shows the panels having a first thermoplastic layer 12, a second thermoplastic layer 14, and a plurality of fibers 16.

Referring back to FIG. 2a, the first and second panels 22, 24 are joined to each other along a pair of opposing sides 26a, 26b and a bottom 28 bridging the opposing sides 26a, 26b. The first and second panels 22, 24 are open along a top end 30 formed opposite the bottom 28. The first and second panels 22, 24 may each include an optional tying flap 32, 34 at the top end 30, as shown in FIG. 2a. The tying flaps 32, 34 may be used to tie the top end 30 closed after use and/or to lift the bag 20 out of the trashcan or container after use.

Figure 3A:
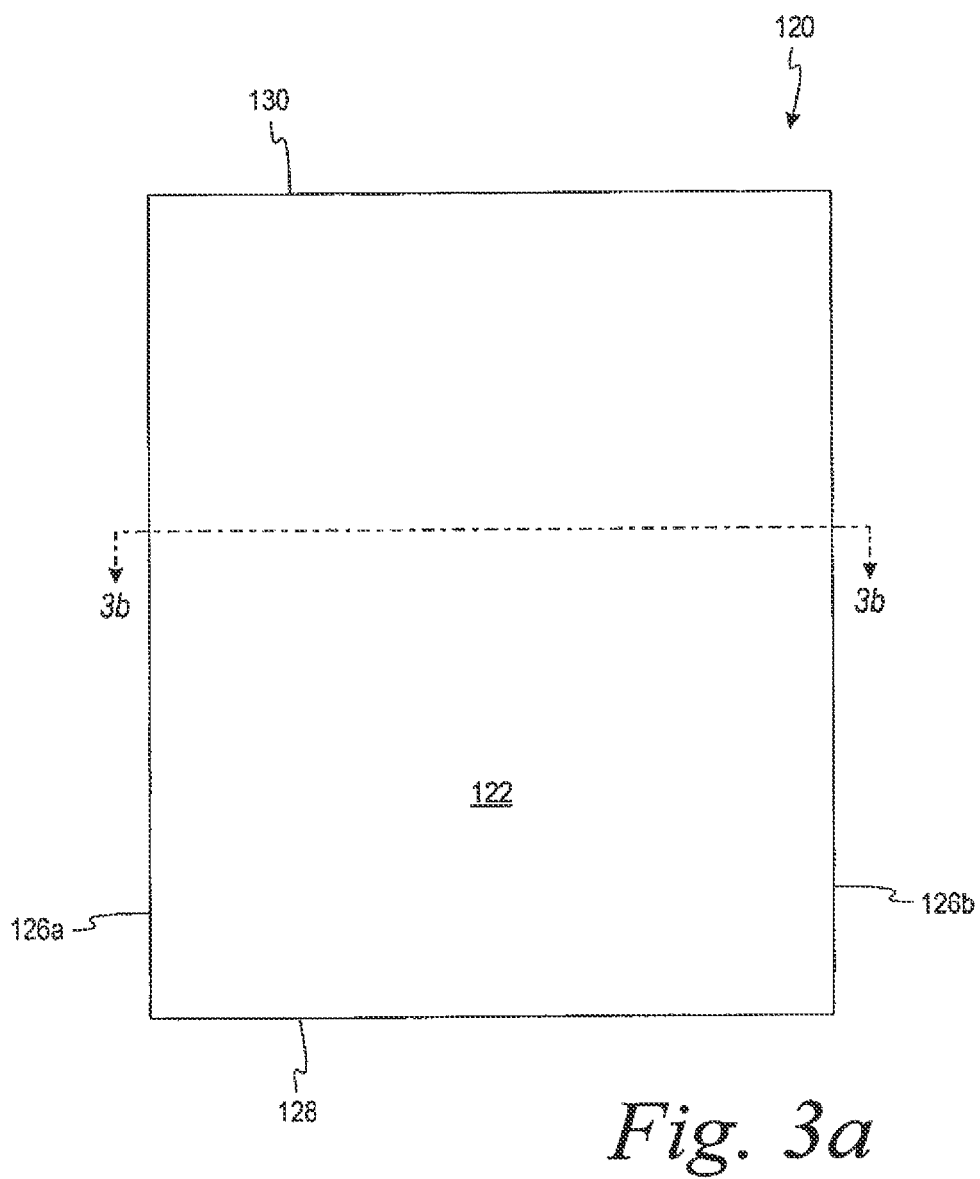
FIG. 3a is a polymeric bag according to another embodiment.
Figure 3B:
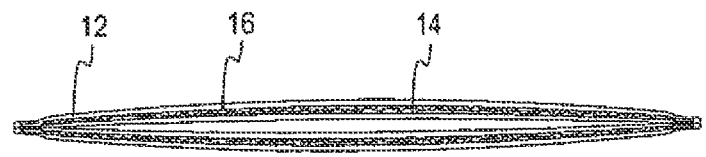

The top end of the bag may also be flat (i.e., generally perpendicular to the sides), as depicted in FIG. 3a. Specifically, a polymeric bag 120 is depicted with a first body panel 122, and a second body panel on the opposing side that is not shown in FIG. 3a. FIG. 3b is a cross-sectional view of the panels generally taken along line 3b-3b in FIG. 3a that shows the panels having a first thermoplastic layer 12, a second thermoplastic layer 14, and a plurality of fibers 16.

The first and second body panels of FIG. 3a are joined to each other along a pair of opposing sides 126a, 126b and a bottom 128 bridging the opposing sides 126a, 126b. The first and second panels of FIG. 3a are open along a generally flat top end 130 formed opposite the bottom 28. It is contemplated that the top end may be configured differently than depicted in FIGS. 2a and 3a.

The first and second panels 22, 24 of FIG. 2a may be formed of one polymeric sheet of fiber-reinforced film that is folded to create the bottom 28, a first opposing side 26a, or the second opposing side 26b. The non-folded bottom 28 and/or opposing sides 26a, 26b would then be sealed, leaving the top end 30 open. Thus, the bottom 28 or one of the opposing sides in this embodiment are folded with the remaining ones being sealed. As a result, the bottom and opposing sides are closed. Thus, the term closed includes the bottom and opposing sides being folded or sealed together. Similarly, the first and second panels of FIG. 3a may be formed by folding in a similar manner.

Alternatively, the first and second panels 22, 24 of FIG. 2b may be formed from two separate sheets of thermoplastic fiber-reinforced film that are sealed together at both of the pair of opposing sides 26a, 26b and the bottom 28. Thus, the bottom and opposing sides are closed together. The top end 30 remains open to create the bag 20. Similarly, the first and second panels of FIG. 3a may be formed by sealing in a similar manner.

The bags may be used for storage or collecting items, including refuse bulk storage. This, of course, includes common sized bags such as tall kitchen bags (13 gallon size) and large garbage bags (33 gallon size).

Processes

Blown Film Processes

According to one process, the fiber-reinforced film may be formed by a blown film process using one or more extruders. For example, a single-extruder process may be employed to form the fiber-reinforced film. The single extruder may use a single or a twin-screw system. Alternatively, a tandem extruder process with single or twin screws may be employed to form the fiber-reinforced film. The single or tandem extruder processes may be vertical or horizontal extruders.

According to one blown film process, resin pellets for forming the thermoplastic layers (e.g., a polyolefin blown film) may be admixed with optional ingredients such as those described above. This material is continuously fed into a hopper of an extruder. The feed material and any optional ingredients are conveyed forward by at least one screw within a barrel of the extruder. During this conveying the material is compressed, heated, mixed (if optional ingredients are present), and converted to a polymeric melt. After the thermoplastic film is extruded through an extension die, a plurality of fibers is introduced inside of the film bubble or tube via a fiber-distribution apparatus. The film bubble or tube is collapsed to form a fiber-reinforced film.

Figure 4:
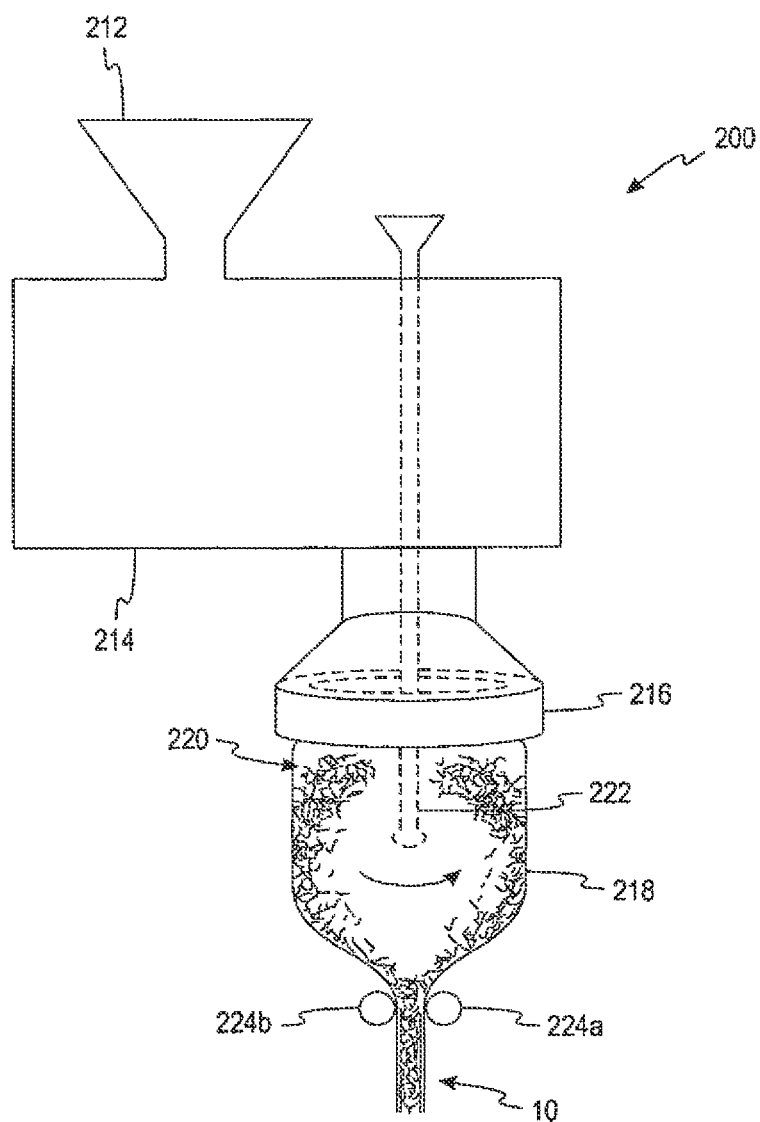
FIG. 4 is a schematic flow diagram of an overall sequence of operations involved in manufacturing a fiber-reinforced film according to one blown-film process.

According to one process, a single extruder process 200 of FIG. 4 may be used for extruding a thermoplastic blown film to be used in forming the fiber-reinforced film. Thermoplastic resins (e.g., a polyolefin such as LDPE or LLDPE) are mixed with optional ingredients (e.g., slip, anti-block, or combinations thereof), if any, and fed continuously into a hopper 212 of an extruder 214. The thermoplastic resin and any optional ingredients are conveyed forward by a helical screw within a barrel of the extruder as the thermoplastic resin and any optional ingredients are admixed (if any optional ingredients are present), compressed, heated, and converted to a polymeric melt.

In general, the temperature of the extruder should be sufficient to melt the thermoplastic resin and to promote efficient mixing, if additional ingredients are present. The polymeric melt is then extruded through an extension die, such as annular die 216. It is contemplated that the extension die may be of a different configuration than depicted in FIG. 4, such as being, for example, an oval shape.

Figure 5:
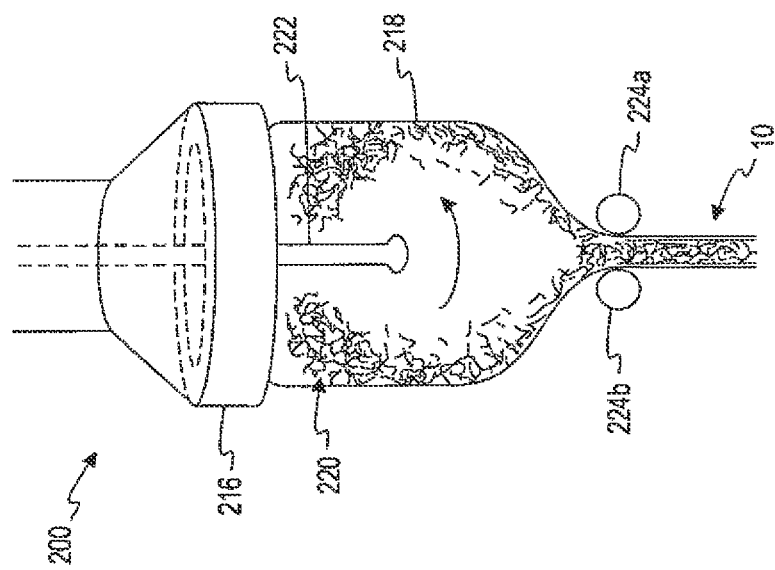
FIG. 5 is an enlarged view of the extrusion die and the film bubble of FIG. 4 involved in manufacturing a fiber-reinforced film.

Referring to FIGS. 4 and 5, after the thermoplastic film is extruded from the extension die 216, the thermoplastic film is in a form of a film bubble or tube 218 that is filled with, for example, air. After the thermoplastic film is extruded, a plurality of fibers 220 is introduced inside of the film bubble or tube 218 via, for example, a fiber-distribution apparatus 222.

According to one process, the plurality of fibers is provided from an off-line manufacturing process. For example, the plurality of fibers may be commercially purchased and typically these fibers are purchased in the form of bales. A bale is defined herein as a large package of fiber that is tightly bound with twine or wire and often wrapped. It is contemplated that the plurality of fibers may be purchased loose in, for example, large storage bins. If bales are used, the bales are broken apart by separating the fibers using conventional technology such as a shredder-like machines. The machine used to cut the strands into smaller individual fibers may be referred to as a tow cutter. One supplier that make tow cutters is DM&E of Shelby, N.C. Tow cutters are manufactured in different sizes and cutter blade assemblies are commercially available to provide different staple cut lengths.

Once the fibers are separated, they may be fluidized in an air stream. The fiber-distribution apparatus may gain access to the annular die 216 via one or more openings formed therein. One example of a commercially available fiber-distribution apparatus is the vertical fine opener that is manufactured by Fiber Controls Corporation of Gastonia, N.C. One such example is Model MFO made by Fiber Controls Corporation. It is contemplated that there are other fiber-distribution apparatus may be used.

The plurality of the fibers from the fiber-distribution apparatus may be distributed by a variety of methods in the film bubble or tube. It is desirable for the fibers to be placed in a roughly even distribution at a given coverage in the resulting fiber-reinforced film. The fiber-distribution apparatus 222 may rotate to assist in distributing the plurality of fibers 220.

To assist in attaining such a distribution, the plurality of fibers may be distributed by, for example, an air conveying system that blows the plurality of fibers towards the inner surface of the film bubble or tube 218. This air conveying system may blow the plurality of fibers against the inner surface of the film bubble or tube. According to another method, the plurality of fibers may be dropped and distributed by gravity in a vertical extruder.

It is contemplated that a mechanical distribution of the plurality of fibers may be performed. For example, the fiber-distribution apparatus may include a tube with a rotating element such that when the plurality of fibers contacts the rotating element, the fibers break away and directional move to the inner surface of the film bubble or tube. The rotating element may be in the shape of a disk and also include an impeller.

To assist in improving the distribution of the plurality of fibers, it may be desirable for the plurality of fibers to be placed near the inner surface of the film bubble or tube 218. It is more desirable for the plurality of fibers to actual contact or adhere to the inner surface of the film bubble or tube 218.

To assist the plurality of fibers in getting near or contacting the inner surface of the film bubble or tube, a number of processes may be used. For example, a static electric charge may be induced on the plurality of fibers to assist in temporarily contacting or sticking the fibers to the inner surface of the film bubble or tube. Thus, the affinity of the plurality of fibers to the film bubble is improved. Additionally, a different charge may be placed on the inner surface of the film bubble or tube that assists in attracting the plurality of fibers to the inner surface of the film bubble or film.

To assist the plurality of fibers in remaining in contact with the inner surface of the film bubble or tube, the plurality of fibers may have an elevated temperature. Alternatively, or in addition to, the temperature of the inner surface of the film bubble or tube may have an elevated temperature that assists the plurality of fibers in remaining in contact thereto.

According to another process, to assist in having the plurality of fibers contact or adhere to the inner surface of the film bubble or tube, the plurality of fibers may have an additive that is sensitive to certain conditions. One example of an additive that may be used in the plurality of fibers is one that is sensitive to a certain type of energy (e.g., infrared, microwave, or radio frequency) that is only absorbed by the additive. This type of additive heats up on exposure to, for example, infrared energy. By increasing the temperature of the plurality of fibers, the plurality of fibers has improved contact with the inner surface of the film bubble or tube.

It is contemplated that the following could be combined together to improve the contact between the plurality of fibers and the inner surface of the film bubble or tube: (a) inducing a static-electric charge, and (b) elevating the temperature of the inner surface of the bubble, the plurality of fibers, or both. As discussed above, the temperature may be elevated by exposing energy to energy-sensitive additives in the inner surface of the film bubble, the plurality of fibers, or both. The contact between the plurality of fibers and the inner surface of the film bubble or tube is enhanced if the film bubble or tube has yet to crystallize.

The size of the film bubble or tube can vary, but is generally from about 10 to about 100 feet in length from the extension die. The diameter of the film bubble or tube is dependent on factors such as the amount of air flow and thickness of the film bubble. The thickness of the film bubble or tube is dependent on factors such as the amount of thermoplastic material exiting the die, the speed of the thermoplastic material exiting the die, and the amount of air pressure forming the film bubble or tube.

The film bubble is collapsed after introducing the plurality of fibers so as to form a fiber-reinforced film such as, for example, fiber-reinforced film 10 of FIG. 1. As shown in FIGS. 4 and 5, the film bubble may be collapsed by pinching between two nip rollers 224a, 224b. The pressure produced by the nip rollers on the collapsed film bubble or tube assists the plurality of fibers in adhering to the collapsed inner surface of the thermoplastic layers. The film bubble or tube may be collapsed by other methods such as, for example, a S-ramp that provides tension in collapsing the film bubble or tube. After the film bubble or tube 218 is collapsed, a resultant fiber-reinforced film is formed. As shown in FIGS. 4 and 5, the resultant fiber-reinforced film may be as fiber-reinforced film 10. To assist in improving the tensile strength, tear resistance, and puncture resistance of the fiber-reinforced film, it is desirable to place at least some of the plurality of fibers in a generally flat position relative to the thermoplastic film layers.

The fiber-reinforced film may be exposed to other process operations such as slitting, being taken up on one or more winding reels or both. The fiber-reinforced film may be used to form a thermoplastic bag such as shown in FIGS. 2a and 3a.

Figure 6:
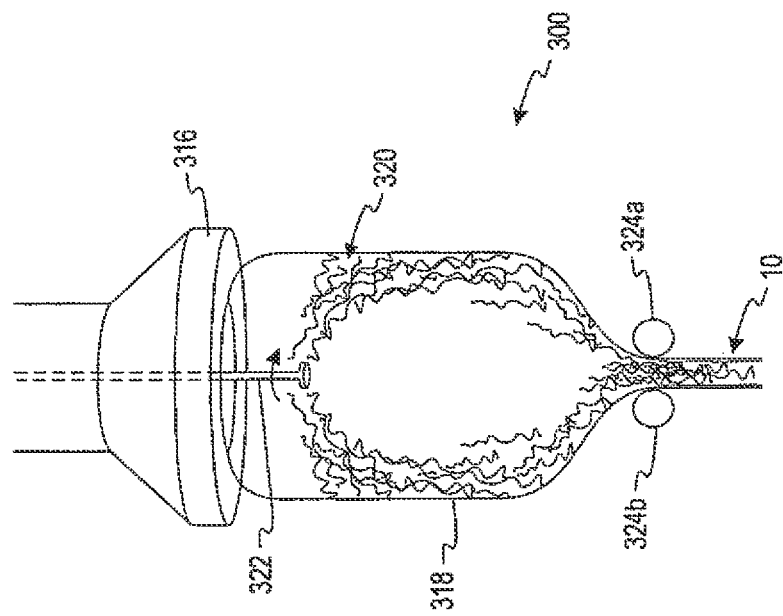
FIG. 6 is an enlarged view of the extrusion die and the film bubble according to another blown-film process.

Alternatively, the process of forming the fiber-reinforced film may include forming the plurality of fibers within the fiber-distribution apparatus. One such method of forming the plurality of fibers in the fiber-distribution apparatus is by melt-spinning Referring to FIG. 6, a portion of a blown film process 300 is shown that includes a blown film bubble or tube 318 being formed from an extension die 316. The blown film process also includes a fiber-distribution apparatus 322 that forms the plurality of fibers 320. Once the blown film bubble 318 is extruded, a centrifugal die of the fiber-distribution apparatus 322 rotates as polymer is fed into the centrifugal die to form the fibers. The polymer, temperature, die gap, and the centrifugal rotation speed determine the size of the extruded fibers. The plurality of fibers may be formed and cut to length in the in-line process.

In the blown film process 300, the plurality of fibers is formed in-line. The plurality of fibers may be formed by an extrusion process such as described in conjunction with FIG. 4. The plurality of fibers may be distributed within the film bubble or tube 318 with a fiber-distribution apparatus that uses, for example, air or mechanical methods such as described in connection with FIGS. 4 and 5. The size of the plurality of fibers formed in an in-line process is typically longer than the plurality of fibers from purchased bales. Also, these longer fibers formed in an in-line system are often more tear resistant. After the film bubble or tube 318 is collapsed, a resultant fiber-reinforced film, such as fiber-reinforced film 10 is formed.

Cast Process

Figure 7:
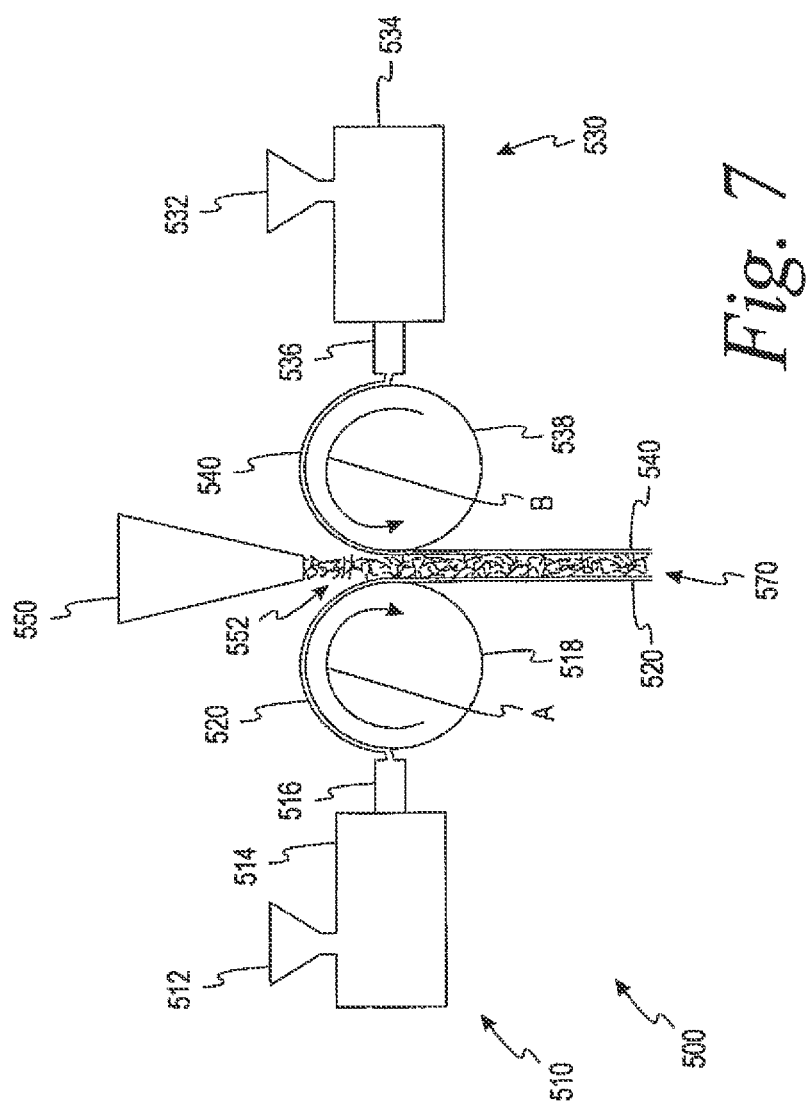
FIG. 7 is a schematic flow diagram of an overall sequence of operations involved in manufacturing a fiber-reinforced film according to one cast-film process.

According to another process, a fiber-reinforced film may be formed by a cast process. One example of a cast process 500 is depicted in FIG. 7. According to one embodiment, two extruders processes 510, 530 of FIG. 4 may be used to extrude respective first and second thermoplastic layers to be used in forming the fiber-reinforced film. Pellets of thermoplastic resins (e.g., a polyolefin such as LDPE or LLDPE) are mixed with optional ingredients, if any, and fed continuously into respective hoppers 512, 532. The thermoplastic resin and any optional ingredients are conveyed forward by one or more screws within the extruder 514, 534 as the thermoplastic resin and any optional ingredients are admixed (if any optional ingredients are added), compressed, heated, and melted.

The extruded materials exit the respective extension dies 516, 536 as first and second thermoplastic layers 520, 540. The first and second thermoplastic layers 520, 540 are exited onto respective casting rolls 518, 538. The casting roll 518 moves in the direction of arrow A so as to transport the first thermoplastic film layer 520 in a clockwise fashion. The casting roll 538 moves in the direction of arrow B so as to move the second thermoplastic film layer 540 in a counterclockwise fashion. A fiber-distribution apparatus 550 allows a plurality of fibers 552 to vertically drop between the first and second thermoplastic layers 520 and 540. The first and second thermoplastic layers 520, 540 and the plurality of fibers 552 form a fiber-reinforced film 570. Instead of individual fibers being placed between the first and second thermoplastic layers 516, 536 such as shown in FIG. 7, a sheet of fibers may be provided between the first and second thermoplastic layers. For example, this sheet may be a non-woven sheet. The process of using non-woven fibers to form a continuous sheet of material is referred to as a carding process. It is contemplated that other cast-film processes may be employed to form a fiber-reinforced film.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

The invention claimed is:

1. A cast-film process for making a fiber-reinforced film, comprising:
   providing at least a first thermoplastic resin;
   melting the at least first thermoplastic resin;
   extruding the at least first thermoplastic resin through a first extension die to form a first thermoplastic film;
   providing at least a second thermoplastic resin;
   melting the at least second thermoplastic resin;
   extruding the at least second thermoplastic resin through a second extension die to form a second thermoplastic film;
   transporting the first and second thermoplastic films along respective casting rollers; and
   introducing a plurality of fibers between the first and second thermoplastic films so as to form a fiber-reinforced film, the fiber-reinforced film having a thickness between about 0.2 mil to about 2.0 mils and having a first thermoplastic layer, a second thermoplastic layer, and a plurality of fibers dispersed therebetween.

2. The process of claim 1, wherein the plurality of fibers is in a continuous sheet.

3. The process of claim 1, wherein the first thermoplastic resin and the second thermoplastic resin are the same.

4. The process of claim 1, wherein the at least one thermoplastic resin is selected from the group consisting of polyolefins, polyesters, nylons, alkenyl aromatic polymers, polyvinyl chlorides, and combinations thereof.

5. The process of claim 1, wherein the plurality of fibers is a thermoplastic material.

6. A cast-film process for making a fiber-reinforced bag, comprising:
   providing at least a first thermoplastic resin;
   melting the at least first thermoplastic resin;

extruding the at least first thermoplastic resin through a first extension die to form a first thermoplastic film;

providing at least a second thermoplastic resin;

melting the at least second thermoplastic resin;

extruding the at least second thermoplastic resin through a second extension die to form a second thermoplastic film;

transporting the first and second thermoplastic films along respective casting rollers;

introducing a plurality of fibers between the first and second thermoplastic films so as to form a fiber-reinforced film, the fiber-reinforced film having a first thermoplastic layer, a second thermoplastic layer, and a plurality of fibers dispersed therebetween;

forming a first and a second body panel from the fiber-reinforced film; and closing the first and second body panels along two opposing sides and a bottom to form a bag.

7. The process of claim 6 wherein the plurality of fibers is in a continuous sheet.

8. The process of claim 6, wherein the first thermoplastic resin and the second thermoplastic resin are the same.

9. The process of claim 6, wherein the at least one thermoplastic resin is selected from the group consisting of polyolefins, polyesters, nylons, alkenyl aromatic polymers, polyvinyl chlorides, and combinations thereof.

10. The process of claim 6, wherein the plurality of fibers is a thermoplastic material.

* * * * *